(12) United States Patent
Broker et al.

(10) Patent No.: US 12,345,423 B2
(45) Date of Patent: **\*Jul. 1, 2025**

(54) SYSTEMS AND METHODS FOR CONTROLLING A VARIABLE GAS VALVE

(71) Applicant: Copeland Comfort Control LP, St. Louis, MO (US)

(72) Inventors: John F. Broker, Warrenton, MO (US); Ryan Jensen, St. Louis, MO (US); Daniel L. Furmanek, Ballwin, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 304 days.

This patent is subject to a terminal disclaimer.

(21) Appl. No.: 18/061,816

(22) Filed: Dec. 5, 2022

(65) Prior Publication Data

US 2024/0183544 A1 Jun. 6, 2024

(51) Int. Cl.
| | |
|---|---|
| *F24D 19/10* | (2006.01) |
| *F23N 1/00* | (2006.01) |
| *G05B 19/416* | (2006.01) |
| *G05D 7/06* | (2006.01) |

(52) U.S. Cl.
CPC ............. *F24D 19/10* (2013.01); *F23N 1/002* (2013.01); *G05B 19/416* (2013.01); *G05D 7/0623* (2013.01); *F23N 2235/16* (2020.01); *G05B 2219/45006* (2013.01)

(58) Field of Classification Search
None
See application file for complete search history.

(56) References Cited

U.S. PATENT DOCUMENTS

| | | |
|---|---|---|
| 3,997,107 A | 12/1976 | Block et al. |
| 5,950,668 A | 9/1999 | Baumann |
| 6,619,613 B1 | 9/2003 | Akamatsu et al. |
| (Continued) | | |

FOREIGN PATENT DOCUMENTS

| | | | |
|---|---|---|---|
| CN | 114370648 A | * 4/2022 | ............ F23N 1/002 |

OTHER PUBLICATIONS

Gaberman, Brett; "How to Clean Up Noisy Sensor Data With A Moving Average Filter", Maker Pro., 2020, https://maker.pro/arduino/tutorial/how-to-clean-noisy-sensor-data-with-a-moving-average-filter, pp. 1.

*Primary Examiner* — David Earl Ogg
(74) *Attorney, Agent, or Firm* — Armstrong Teasdale LLP

(57) ABSTRACT

An integrated furnace controller (IFC) for use in a gas-powered heating system includes a modulating gas valve assembly having a modulating gas valve to variably control a flow of gas through the gas valve assembly and a control circuit. The IFC includes a processor, a memory, and a communication interface. The IFC is communicatively coupled to the modulating gas valve assembly and a mobile device. The memory stores instructions that program the processor to receive, using the communication interface, a valve offset output from the mobile device, store the valve offset in the memory, receive a call for heat, and output one or more commands to the modulating gas valve assembly in response to the call for heat. The one or more commands causing the modulating gas valve assembly to control the modulating gas valve based on a desired gas flow rate and the valve offset.

20 Claims, 6 Drawing Sheets

(56) References Cited

U.S. PATENT DOCUMENTS

| | | |
|---|---|---|
| 8,275,484 B2 | 9/2012 | Lorenz et al. |
| 8,714,460 B2 | 5/2014 | Santinanvat et al. |
| 8,905,063 B2 | 12/2014 | Young et al. |
| 8,947,242 B2 | 2/2015 | Kucera et al. |
| 9,032,991 B2 | 5/2015 | Broker et al. |
| 9,038,658 B2 | 5/2015 | Santinanavat et al. |
| 9,074,770 B2 | 7/2015 | Young et al. |
| 9,212,821 B2 | 12/2015 | Broker et al. |
| 9,689,569 B2 | 6/2017 | Vie |
| 9,995,486 B2 | 6/2018 | Young et al. |
| 10,564,062 B2 | 2/2020 | Karg et al. |
| 10,697,632 B2 | 6/2020 | Kucera et al. |
| 11,073,281 B2 | 7/2021 | Hazzard et al. |
| 11,585,543 B2 | 2/2023 | Harrington et al. |
| 2010/0009303 A1* | 1/2010 | Santinanavat ....... G05D 16/202 431/12 |
| 2011/0266473 A1 | 11/2011 | Santinanavat et al. |
| 2011/0271880 A1 | 11/2011 | Thompson |
| 2012/0214117 A1* | 8/2012 | Broker .................... F23N 1/002 432/47 |
| 2013/0312730 A1 | 11/2013 | Stark et al. |
| 2014/0283929 A1* | 9/2014 | Santinanavat ........ F16K 31/165 137/487.5 |
| 2016/0077531 A1* | 3/2016 | Kucera ................ G05D 7/0647 137/485 |
| 2022/0299238 A1 | 9/2022 | Gullapalli |
| 2023/0129818 A1 | 4/2023 | Harrington et al. |

* cited by examiner

SYSTEMS AND METHODS FOR CONTROLLING A VARIABLE GAS VALVE

FIELD

The field of the disclosure relates gas powered appliances and systems, and more particularly, to systems and methods for setting and communicating the orientation of a variable gas valve, and setting, communicating, and controlling the offsets of a variable gas valve.

BACKGROUND

Gas powered furnaces and appliances typically include a gas valve that controls the provision of gas to a burner. Some such valves are controllable beyond simply on or off and allow the flow of gas to be varied to many different levels between maximum flow and no flow.

The amount of gas (e.g., the outlet pressure) provided at a particular setting may be adjusted using offsets. The offsets are typically adjusted by turning a setscrew on the valve or adjusting one or more dipswitch on a control board. Making such offset adjustments on an installed valve may be difficult, because of the setscrew or dipswitch(es) may be in a location that is difficult to reach or oriented so that they are difficult to see or interpret.

In at least some gas powered furnaces and appliances, the orientation of the component including the gas valve may be installed in more than one orientation. The gas valve is typically installed in a fixed relationship with the rest of the component within which it is installed. Therefore, the orientation of the gas valve is dictated by the orientation of the component. In different orientations, gravity may affect the valve differently resulting in more or less gas flowing through the valve than is expected.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

According to one aspect of this disclosure, an integrated furnace controller (IFC) for use in a gas-powered heating system includes a modulating gas valve assembly having a modulating gas valve to variably control a flow of gas through the gas valve assembly and a control circuit. The IFC includes a processor, a memory, and a communication interface. The IFC is communicatively coupled to the modulating gas valve assembly and a mobile device. The memory stores instructions that program the processor to receive, using the communication interface, a valve offset output from the mobile device, store the valve offset in the memory, receive a call for heat, and output one or more commands to the modulating gas valve assembly in response to the call for heat. The one or more commands causing the modulating gas valve assembly to control the modulating gas valve based on a desired gas flow rate and the valve offset.

In another aspect, a gas-powered heating system includes a burner, a modulating gas valve assembly connected between a gas source and the burner, a mobile device, and an integrated furnace controller (IFC) The gas valve assembly includes a modulating gas valve to variably control a flow of gas through the gas valve assembly and a control circuit including a controller and a valve memory. The mobile device includes a mobile communication interface, a mobile processor, and a mobile memory. The mobile memory stores instructions that program the mobile processor to receive a valve offset from a user, and output the valve offset of the modulating gas valve using the mobile communication interface. The IFC includes a processor, a memory, and a communication interface and is communicatively coupled to the modulating gas valve assembly and the mobile device. The memory stores instructions that program the processor to receive, using the communication interface, the valve offset output from the mobile device, store the valve offset in the memory, receive a call for heat, and output one or more commands to the modulating gas valve assembly in response to the call for heat. The one or more commands causing the modulating gas valve assembly to control the modulating gas valve based on a desired gas flow rate and the valve offset.

In another aspect, a gas-powered heating system includes a burner, a modulating gas valve assembly connected between a gas source and the burner, a mobile device, and an integrated furnace controller (IFC) The gas valve assembly includes a modulating gas valve to variably control a flow of gas through the gas valve assembly and a control circuit including a controller and a valve memory. The mobile device includes a mobile communication interface, a mobile processor, and a mobile memory. The mobile memory stores instructions that program the mobile processor to receive an orientation of the modulating gas valve from a user, and output the orientation of the modulating gas valve of the modulating gas valve using the mobile communication interface. The IFC includes a processor, a memory, and a communication interface and is communicatively coupled to the modulating gas valve assembly and the mobile device. The memory stores instructions that program the processor to receive, using the communication interface, the orientation of the modulating gas valve output from the mobile device, store the orientation of the modulating gas valve in the memory, receive a call for heat, and output one or more commands to the modulating gas valve assembly in response to the call for heat. The one or more commands causing the modulating gas valve assembly to control the modulating gas valve based on a desired gas flow rate and the orientation of the modulating gas valve.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

For conciseness, examples will be described with respect to a gas powered furnace. However, the methods and systems described herein may be applied to any suitable system or appliance that uses a variable (modulated) gas valve including an agricultural heater, a gas fireplace, a gas oven, and the like. Also for conciseness, examples will be described with respect to a stepper motor regulated gas valve, but the methods and systems described herein may be applied to a system including any modulating gas valve, such as a solenoid coil (also referred to as a voice coil) controlled valve, a pulse width modulation controlled valve, a servo (rotary actuator) controlled valve, or the like.

Figure 1:
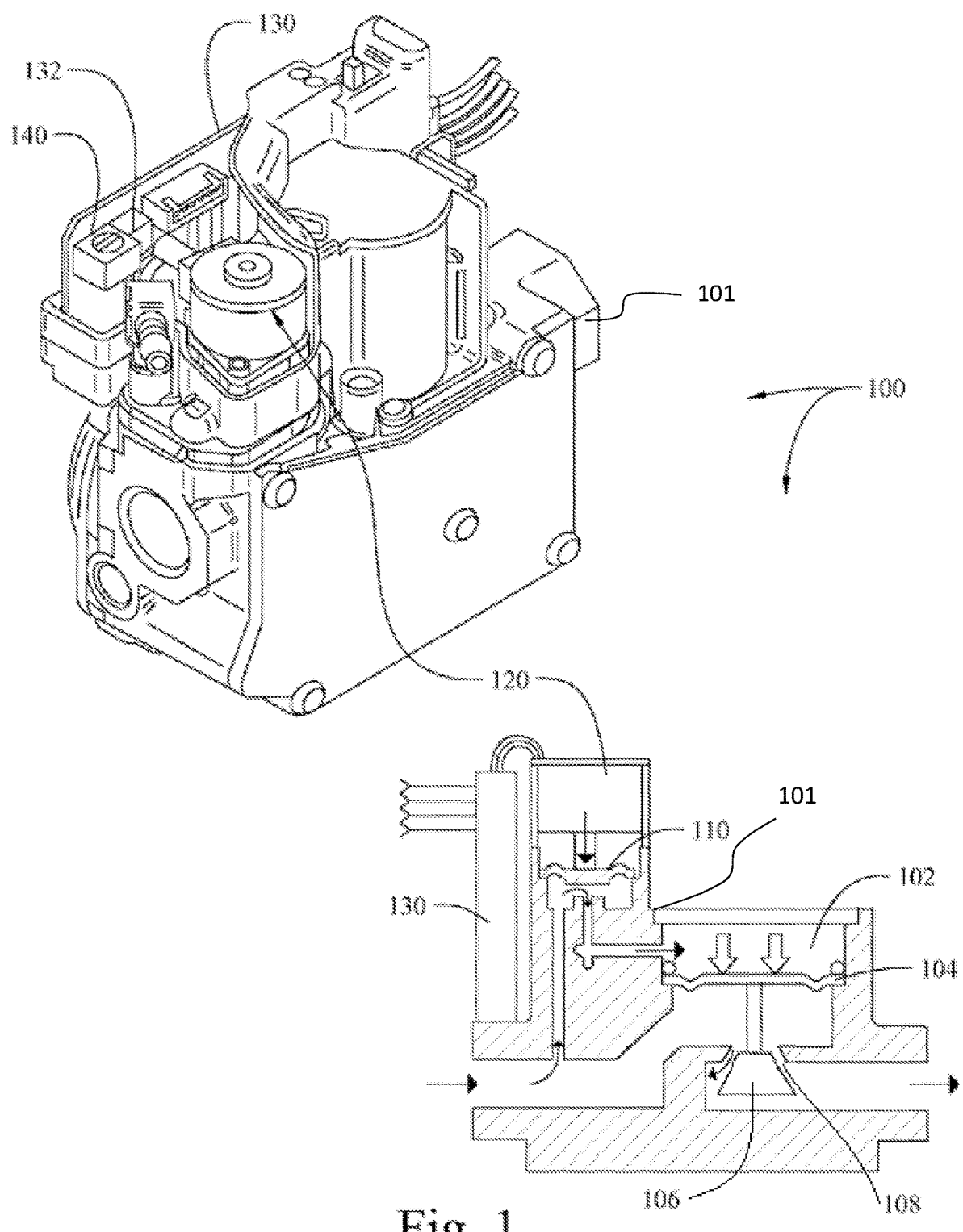
FIG. 1 is a perspective view and a schematic cut-away view of one embodiment of a stepper-motor regulated gas valve according to the present disclosure.

FIG. 1 shows an example stepper-motor regulated gas valve assembly 100. The stepper-motor regulated gas valve assembly 100 includes a gas valve 101 and a controller 130. The gas valve 101 includes a main diaphragm chamber 102, and a main diaphragm 104 disposed in the main diaphragm chamber 102. The main diaphragm 104 controllably displaces a valve 106 relative to a valve opening 108 in response to changes in pressure in the main diaphragm chamber 102, to thereby permit adjustment of the flow of fuel through the valve opening 108. The gas valve 101 further includes a servo-regulator diaphragm 110, which is configured to regulate fluid flow to the main diaphragm chamber 102. The servo-regulator diaphragm therefore controls the fluid pressure applied to the main diaphragm, to control the rate of fuel flow through the valve opening 108. The gas valve 101 also includes a stepper motor 120 configured to move in a stepwise manner to displace the servo-regulator diaphragm 110, for regulating fluid flow to the diaphragm chamber 102 to thereby regulate the rate of fuel flow through the valve 106.

The example accordingly provides for stepper-motor control over the extent of opening of the valve opening 108, to provide modulated fuel flow operation. The example gas valve 101 is governed by a stepper motor 120, rather than a voice coil operator that is used in some embodiments for modulating the position of a valve in some other modulating valves. For a valve utilizing a stepper motor, such as the valve 101, the valve is displaced and the flow rate set by controlling the motor a required number of steps. Typical modulating valves employing a voice coil operator are driven by a milliamp signal ranging from 0 to 180 milliamps, which causes the voice coil to move a distance that is proportional to the amount of milliamps conducted in the coil. For example, a typical modulating furnace controller using a voice coil based valve may generate a 180 milliamp signal where maximum heating capacity operation is desired, and may generate a 20 milliamp signal where minimum heating operation is desired.

The stepper-motor regulated gas valve assembly 100 includes a controller or control circuit 130 configured to receive an input control signal and to control the valve based on the input control signal. The input control signal may be a particular number of steps to actuate the stepper motor 120, a particular flow rate desired, a relative flow rate or valve open percentage (e.g., 100% flow, 25% open, or the like), a milliamp signal as mentioned above, or any other signal to inform the valve assembly 100 how much to open or close the valve. Based at least in part on the input control signal, the control circuit 130 moves the stepper-motor 120 a number of steps, which displaces the servo-regulator diaphragm 110 and thereby controls the rate of fuel flow through the valve opening 108.

Figure 2:
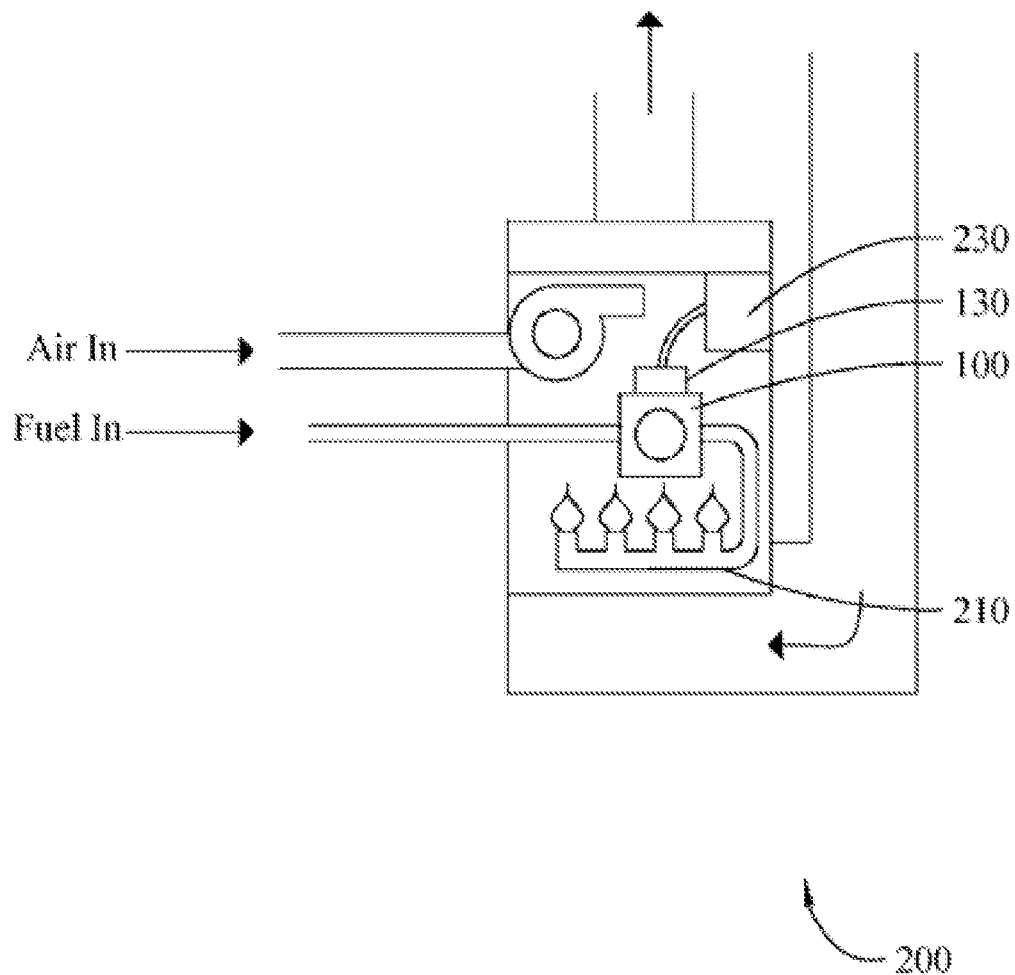
FIG. 2 is an example fuel-fired heating system that is supplied with fuel by the stepper motor regulated gas valve shown in FIG. 1.

The stepper-motor regulated gas valve assembly 100 may be included within a fuel-fired heating system 200 that includes a burner 210 that is supplied with fuel by the stepper-motor regulated gas valve assembly 100, as shown in FIG. 2. The fuel-fired heating system 200 further includes a peripheral component that that controls operation of the system 200, including communicating with the control circuit 130 for controlling the operation of the stepper-motor regulated gas valve assembly 100. In the example embodiment, the peripheral component is an integrated IFC 230 (IFC). In other embodiments, the peripheral component may be a system controller, a thermostat, a mobile device, a computer or any other suitable peripheral for controlling operation of the system 200. The IFC 230 may also be referred to as a system controller. It should be understood that the stepper-motor regulated gas valve assembly 100 utilizes a set of motor step values that correspond to a plurality of positions of the stepper motor 120 for adjusting the regulator, which positions range between a closed no-flow position to a 100% full capacity position. The stepper-motor regulated gas valve assembly 100 may be employed in combination with a burner 210 that is supplied with fuel by the stepper-motor regulated gas valve assembly 100, and a IFC 230 in communication with the control circuit 130 for controlling the operation of the stepper-motor regulated gas valve assembly 100.

Figure 3:
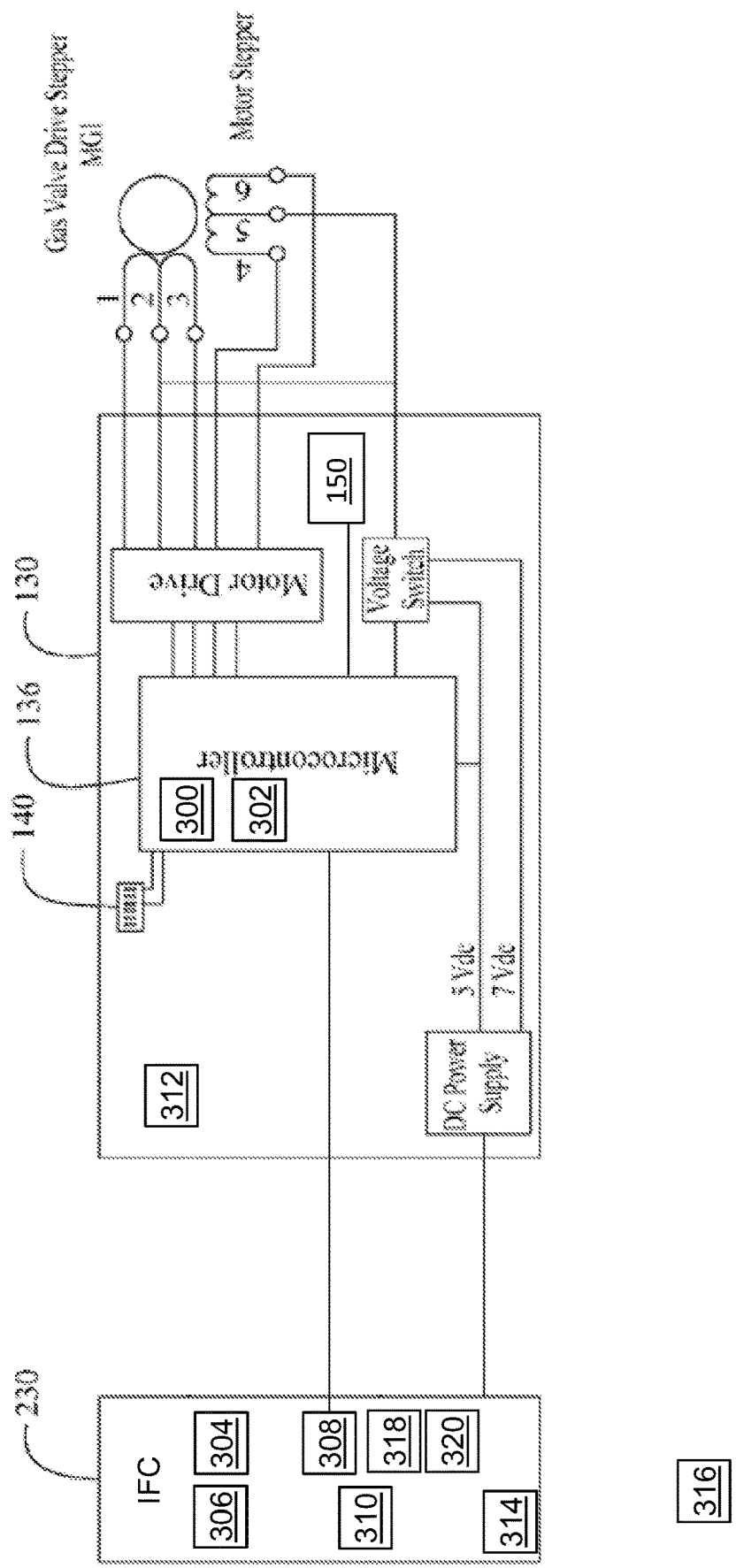
FIG. 3 is an example control circuit for use in connection with the stepper-motor regulated gas valve system shown in FIG. 1.

An example control circuit 130 for use with the stepper-motor regulated gas valve assembly 100 is shown in FIG. 3. The control circuit 130 includes a controller 136 in communication with the IFC 230 (also sometimes referred to as an integrated furnace controller). In the example, the controller is a microcontroller 136 including a valve processor 300 and a valve memory 302. The IFC 230 includes a processor 304, a memory 306, and at least one communication interface 308. In other embodiments, the controller 136 includes a central processing unit, microprocessor, reduced instruction set circuit (RISC), application specific integrated circuit (ASIC), logic circuit, or any other circuit or processor capable of executing the functions described herein, and random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), or any other suitable memory.

The communication interface 308 is communicatively coupled to the controller 136 in the control circuit 130. Although only one communication interface 308 is shown coupled to the control circuit 130, the IFC 230 may include more than one communication interface 308 coupled to the control circuit 130. Moreover, the communication interfaces 308 may be different types of communication interfaces using different types of communication protocols. In some embodiments, for example, the communications interfaces 308 can include a milliamp signal interface, one or more heat signal interfaces, a data communication interface, and/ or any other suitable communications interfaces for communication between the IFC 230 and the control circuit 130.

The communicative connection between the IFC 230 and the control circuit 130 using the communication interface 308 permits the IFC 230 to communicate with the control circuit 130 information, instructions, control signals, updates, data, or the like. The communication interface 308 may use any suitable wired or wireless communication protocol. Wireless communication may include a radio frequency (RF), Bluetooth®, Wi-Fi, a ZigBee®, near field communication (NFC), infrared (IR), and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication may include any suitable wired communication protocol for direct communication including, without limitation, USB, RS232, I2C, SPI, analog, and proprietary I/O protocols. Moreover, in some embodiments, the wired communication may be performed using a wired network adapter allowing communication through a network, such as the Internet, a local area network (LAN), a wide area network (WAN), a mesh network, and/or any other network.

When a call for heat is determined or received by the IFC 230, the IFC 230 will send a command to the control circuit 130 to open the gas valve 101. The IFC 230 will also send a command corresponding to the desired amount of gas flow. The desired flow may be sent as part of the command to open the gas valve 101 or as a separate command. Moreover, in some embodiments, the desired flow may be sent first, so that the valve 101 may be preset to the desired flow rate before the valve 101 is opened. As will be explained in more detail herein, the desired flow rate may be sent as an actual rate (e.g., volume per minute), a pressure, a relative amount to open (e.g., 50% open), a relative flow rate (e.g., 50% of maximum flow rate), a specific number of steps to drive the stepper-motor 120, or the like. In embodiments, in which the control circuit 130 receives a specific number of steps for the stepper-motor 120, the control circuit 130 merely takes the action commanded by the IFC 230 and drives the stepper-motor the requested number of steps. In embodiments in which the desired flow rate is communicated without a specific number of steps, the control signal determines the number of steps the motor must turn or move to set the servo-regulator diaphragm 110 to the requested flow rate. The stepper motor gas valve 100 uses the select motor step value to drive the stepper-motor 120 in a step-wise manner, to the desired stepper motor position, which causes the stepper-motor 120 to displace the servo-regulator diaphragm 110 the desired distance and thereby regulate the output of the valve.

In the example embodiment, the control circuit 130 employs a first look-up table (sometimes referred to as a calibration table) having a plurality of control settings for the modulating gas valve, each control setting being associated with a different gas flow rate. Specifically, the calibration table includes a set of motor step values, which are used to determine the appropriate number of steps the stepper motor 120 must move to achieve a desired flow rate (whether as an absolute value, a relative value, a valve open amount, or the like). The first look-up table is stored in a memory device, such as the memory of the microcontroller 136. In other embodiments, the first look-up table is stored in a memory device separate from the microcontroller 136. In other embodiments, the IFC 230 determines the appropriate number of motor steps, and the furnace controller sends a command for a particular number of steps.

The example IFC 230 includes at least one sensor 310 and the example control circuit 130 includes at least one sensor 312. In other embodiments the IFC 230 or the control circuit 130 does not include any sensors. The sensors 310 and 312 may be any sensors suitable for measuring any variable value of interest. For example, the sensors 310, 312 may include temperature sensors, humidity sensors, air pressure sensors, accelerometers, or the like. In some embodiments in which the sensors 310 and/or 312 include accelerometers, the accelerometers are 1-axis accelerometers operable to detect an orientation of the IFC 230 and/or the control circuit 130 (and, accordingly, the orientation of the valve assembly 100) relative to gravity. In still other embodiments, at least one sensor 312 (such as an accelerometer) is mounted on a portion of the valve assembly 100 other than the control circuit 130.

The IFC 230 includes a remote device communication interface 314 for communication with a remote device 316, such as a mobile phone, a tablet computer, a laptop computer, or the like. The example communication interface 314 is a wireless communication interface for communicative coupling to the remote device. Other embodiments include a wired communication device. Wireless communication may include a radio frequency (RF), Bluetooth®, Wi-Fi, a ZigBee®, near field communication (NFC), infrared (IR), and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication may include any suitable wired communication protocol for direct communication including, without limitation, USB, RS232, I2C, SPI, analog, and proprietary I/O protocols. Moreover, in some embodiments, the wired communication may be performed using a wired network adapter allowing communication through a network, such as the Internet, a local area network (LAN), a wide area network (WAN), a mesh network, and/or any other network.

The example IFC 230 includes an input device 318 and a display device 320. The example input device 318 includes one or more buttons. Alternatively, the input device 318 may include one or more dials, one or more switches, a keyboard, or the like. The display device 320 is one or more seven segment display devices. Alternatively, the display device 320 may be an LCD display, an LED display, a CRT display, a plurality of lights (such as LEDs), or the like. Some embodiments include a touchscreen display that functions as the input device 314 and the display device 320. The input device 318 and he display device 320 may be used together to input data, change settings, retrieve data or settings, and the like to/from the IFC 230.

Figure 4:
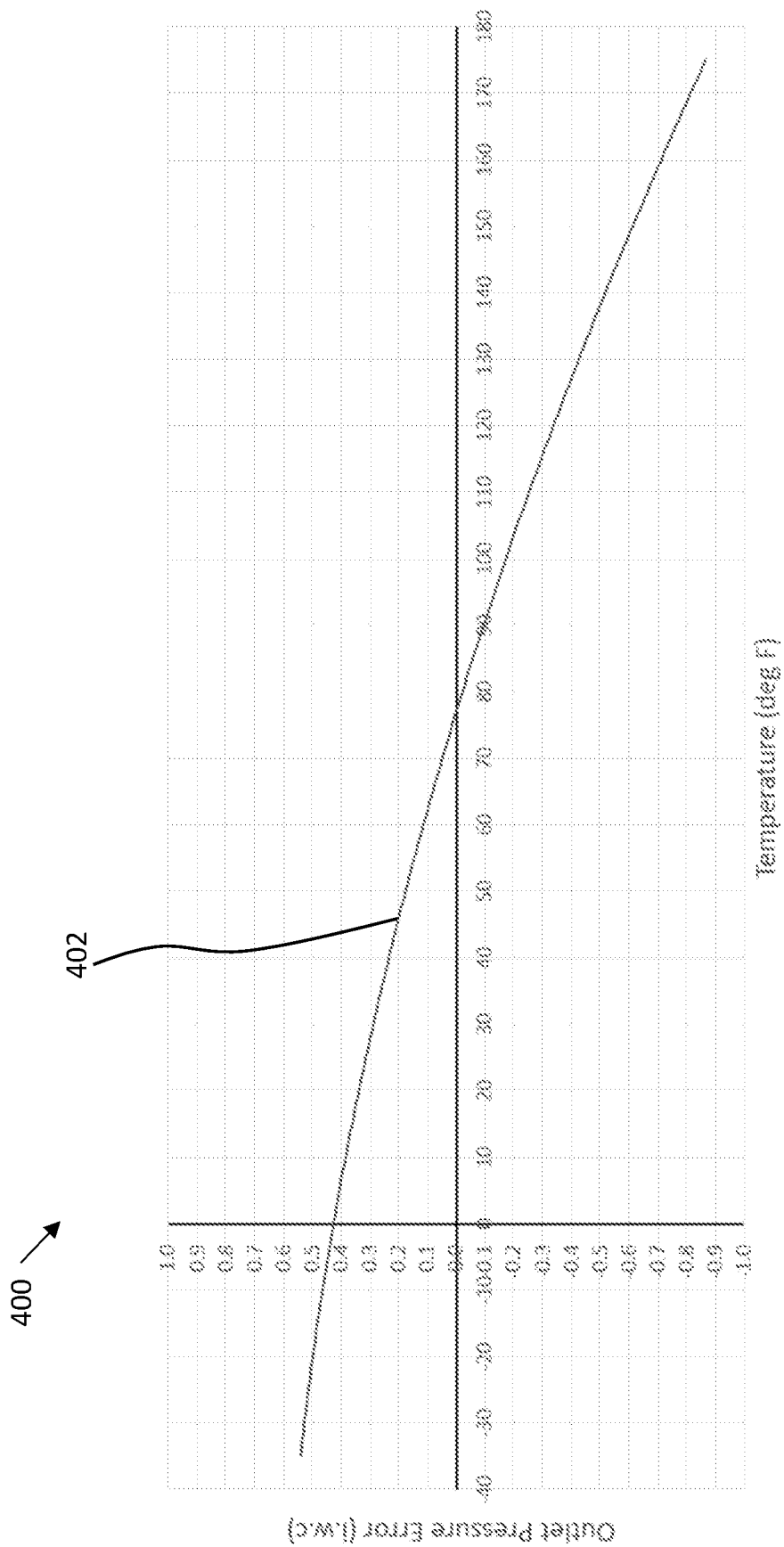
FIG. 4 is a graph of the outlet pressure error for the stepper-motor regulated gas valve system shown in FIG. 1 as a function of ambient temperature.

The ambient temperature around the stepper-motor regulated gas valve assembly 100 can affect the flow through the stepper-motor regulated gas valve assembly 100. That is, the actual flow through the stepper-motor regulated gas valve assembly 100 (e.g., the outlet pressure) may not be the same as the expected flow through the stepper-motor regulated gas valve assembly 100. Without being limited to any particular theory or cause, this error may be caused for example by one or more parts of the gas valve 101 expanding and contracting with changing temperatures. FIG. 4 is a graph 400 of an example error curve 402 for the stepper-motor regulated gas valve assembly 100. In the graph, the error curve shows the error in outlet pressure in inches of water column (IWC) as a function of ambient temperature in degrees Fahrenheit around the stepper-motor regulated gas valve assembly 100. Because the stepper-motor regulated gas valve assembly 100 does not include an outlet pressure sensor, the control circuit 130 does not know what the outlet pressure is and cannot adjust the flow using feedback from such a pressure sensor. The control circuit 130 (and specifically the microcontroller 136) is configured to compensate for temperature based error in the actual flow through the stepper-motor regulated gas valve assembly 100 based on a measured temperature. In the example embodiment, the control circuit 100 includes a temperature sensor 150 to detect the ambient temperature around the stepper-motor regulated gas valve assembly 100. In other embodiments, the temperature sensor is mounted on the gas valve 101, on the IFC 230, or in any other suitable location. In this example, the temperature sensor 150 is a thermistor, but other embodiments include any other suitable sensor for measuring temperature.

To compensate for temperature caused error, the microcontroller 136 includes an error correction look-up table that contains the adjustments needed to be made to the steps determined without reference to temperature. That is, in response to the command signal from the IFC 230, the microcontroller will first look up in a first look-up table how many steps to be taken by the stepper-motor 120 to meet the outlet pressure commanded by the command signal. Next the microcontroller 136 will determine the temperature measured by the temperature sensor 150. In some embodiments, the microcontroller periodically measures the temperature regardless of whether or not it has received a command from the furnace controller, and determining the temperature at this point involves retrieving the last measured temperature or an average of several previously measured temperatures (e.g., an average of the last five temperature readings), or the like. The microcontroller 136 will then lookup the adjustment needed for the determined temperature in the error correction look-up table, and will adjust the number of steps from the first look-up table accordingly. For example, if the first look-up table indicates one-hundred steps clockwise are needed in response to a particular command from the IFC 230 and the second look-up table indicates for the determined temperature the outlet pressure will be wrong by five steps clockwise, the microcontroller 136 drives the stepper-motor 120 ninety-five steps clockwise. The error correction look-up table may store the error correction data in terms of steps and direction for each temperature, in terms of outlet pressure error for each temperature, or in any other suitable terms. If the data is stored in terms of outlet pressure error in IWC for each temperature, the microcontroller 136 is also programmed to know how the outlet pressure change in IWC for each step of the stepper-motor 120 in order to determine how many steps need to be changed to offset the temperature induced error.

In still other embodiments, the temperature error correction is included in the first look-up table. In such embodiment, the first look-up table includes the steps needed for each demand at each temperature. Thus, the microcontroller 136 would receive a command signal demanding a particular flow, determine the current temperature, and look up the number of steps to achieve the commanded flow at the current temperature. Such embodiments may reduce the number of steps to be taken by the microcontroller 136, but may preclude the ability to selectively disable temperature correction, which is possible with embodiments using a separate error correction look-up table.

The error correction look-up table may be created using any suitable measurement techniques, whether experimental or theoretical. In the example embodiment, the error correction look-up table is created by measuring the outlet pressure of multiple copies of the same stepper-motor regulated gas valve assembly 100 at different steps and different controlled temperatures and comparing it to the expected outlet pressure for each temperature and number of steps to determine the amount of error (if any) for each temperature across a range of temperature. The errors for each different gas valve 100 are then averaged and the averaged errors are used to create the error correction look-up table. Alternatively, the errors may be theoretically calculated and used to create the error correction look-up table. In still other embodiments, each individual stepper-motor regulated gas valve assembly 100 may be tested as described above and the error measurements for each stepper-motor regulated gas valve assembly 100 may be used to create an error correction look-up table specific to that particular stepper-motor regulated gas valve assembly 100.

In the real world, the temperature of the stepper-motor regulated gas valve assembly 100 may not always be equal to the ambient temperature around the stepper-motor regulated gas valve assembly 100. As the ambient temperature around the stepper-motor regulated gas valve assembly 100 changes, the temperature of the stepper-motor regulated gas valve assembly 100 will change, but it will generally lag behind the ambient temperature until the ambient temperature holds steady long enough for the stepper-motor regulated gas valve assembly 100 temperature to reach the same temperature. If the error-correction look-up table is based on the temperature of the stepper-motor regulated gas valve assembly 100, the table may at times (e.g., when the ambient temperature is changing or recently changed) provide incorrect values for the error correction if the ambient temperature is used to determine the correction. Thus, the microcontroller 136 is programmed in some embodiments to slow down the temperature correction using a low pass filter.

To perform the low pass filtering of the temperature, the temperature is measured periodically even when there is no command for operation from the IFC 230. The first measured temperature is stored in a temperature variable to be used for control of the stepper-motor regulated gas valve assembly 100 when a command is received from the IFC 230. If the next periodic temperature measurement is the same, the temperature variable will remain the same. If the next periodic temperature measurement is different, a value between the first temperature measurement and the next periodic temperature measurement (inclusive) will be stored as the temperature variable. The value to be stored as the temperature variable is determined to avoid any large, rapid changes in temperature. Any suitable technique may be used to slow down the temperature change used for control as compared to the temperature change of subsequent measurements. The value may, for example, be limited to no more than a predetermined change per a predetermined time. If the next periodic measurement is less than or equal to the predetermined change more/less than the last stored temperature variable, the next periodic measurement is stored as the temperature variable. If the next periodic measurement is more than the predetermined change more/less than the last stored temperature variable, the temperature variable is increased/decreased by only the predetermined change, and the process repeats for subsequent measurements.

One example method of filtering the temperature measurement to avoid rapid changes in temperature will be described. In this method degF_temp is a variable representing latest temperature measured by the temperature sensor or the latest average of a series of temperature measurements. Beta is a variable that is set at 32, but different values may be used to change the response of the filter. Lp_filter_temp is a variable updated after each temperature lookup. When first started:

$$Lp\_filter\_temp = (degF\_temp+40)*Beta \quad (1)$$

On all subsequent degF_temp lookups, the Lp_filter_temp is set to:

$$Lp\_filter\_temp = Lp\_filter\_temp - [(Lp\_filter\_temp - (degF\_temp+40)*Beta)/Beta] \quad (2)$$

and the division is truncated. The remained need not be considered. The remainder of Lp_filter_temp/Beta is calculated. A variable degF_filtered_temp is set to:

$$degF\_filtered\_temp = Lp\_filter\_temp/Beta - 40 \quad (3)$$

If the remainder of Lp_filter_temp/Beta is greater than or equal to 16, one is added to degF_filtered_temp. The degF_filtered_temp value is the temperature value used to determine how many steps of adjustment are needed to correct for the temperature.

Figure 5:
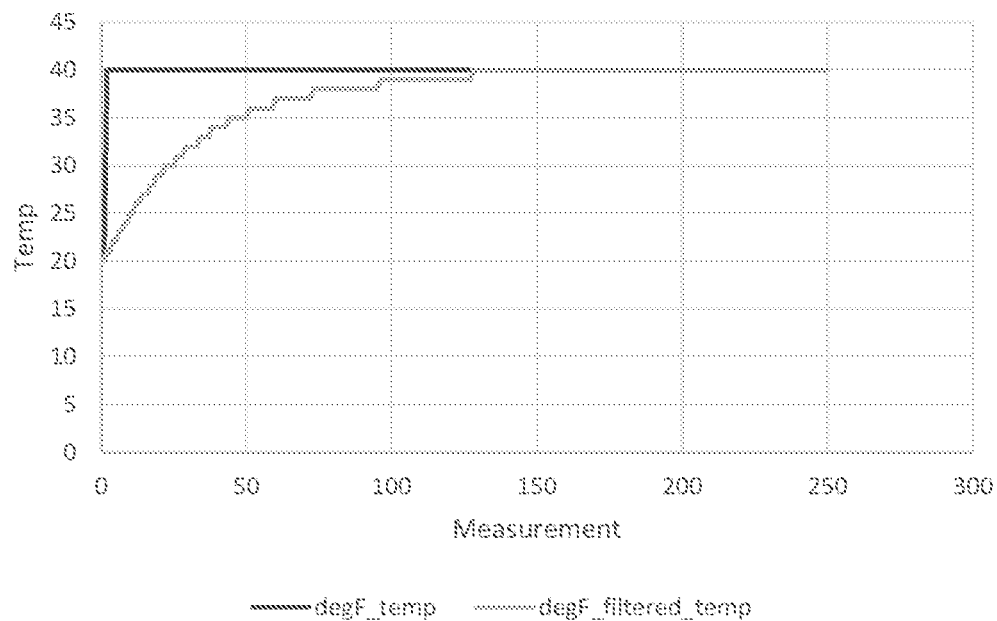
FIG. 5 is a graph of a change in measured temperature and a variable for compensating control of the stepper-motor regulated gas valve system shown in FIG. 1 for temperature as a function of measurement cycles.

Table 1 below is a table of degF_temp, Lp_filter_temp, the remainder of Lp_filter_temp/Beta, and degF_filtered_temp as described above over fifty temperature measurements. As can be seen, there is a step change from twenty degrees to forty degrees between the first and second measurements and the temperature remains forty degrees thereafter. The degF_filtered_temp can be seen to slowly increase. Although not shown in the table, degF_filtered_temp will reach forty degrees after about the $128^{th}$ cycle. FIG. 5 is a graph of the measured temperature (degF_temp) and the calculated degF_filtered_temp over 250 measurements.

TABLE 1

| degF_temp | Lp_filter_temp | Remainder of Lp_filter_temp/Beta | degF_filtered_temp |
|---|---|---|---|
| 20 | 1920 | 0 | 20 |
| 40 | 1940 | 20 | 21 |
| 40 | 1959 | 7 | 21 |
| 40 | 1977 | 25 | 22 |
| 40 | 1995 | 11 | 22 |
| 40 | 2012 | 28 | 23 |
| 40 | 2029 | 13 | 23 |
| 40 | 2045 | 29 | 24 |
| 40 | 2061 | 13 | 24 |
| 40 | 2076 | 28 | 25 |
| 40 | 2091 | 11 | 25 |
| 40 | 2105 | 25 | 26 |
| 40 | 2119 | 7 | 26 |
| 40 | 2132 | 20 | 27 |
| 40 | 2145 | 1 | 27 |
| 40 | 2157 | 13 | 27 |
| 40 | 2169 | 25 | 28 |
| 40 | 2181 | 5 | 28 |
| 40 | 2192 | 16 | 29 |
| 40 | 2203 | 27 | 29 |
| 40 | 2214 | 6 | 29 |
| 40 | 2224 | 16 | 30 |
| 40 | 2234 | 26 | 30 |
| 40 | 2244 | 4 | 30 |
| 40 | 2253 | 13 | 30 |
| 40 | 2262 | 22 | 31 |
| 40 | 2271 | 31 | 31 |
| 40 | 2280 | 8 | 31 |
| 40 | 2288 | 16 | 32 |
| 40 | 2296 | 24 | 32 |
| 40 | 2304 | 0 | 32 |
| 40 | 2312 | 8 | 32 |
| 40 | 2319 | 15 | 32 |
| 40 | 2326 | 22 | 33 |
| 40 | 2333 | 29 | 33 |
| 40 | 2340 | 4 | 33 |
| 40 | 2346 | 10 | 33 |
| 40 | 2352 | 16 | 34 |
| 40 | 2358 | 22 | 34 |
| 40 | 2364 | 28 | 34 |
| 40 | 2370 | 2 | 34 |
| 40 | 2375 | 7 | 34 |
| 40 | 2380 | 12 | 34 |
| 40 | 2385 | 17 | 35 |
| 40 | 2390 | 22 | 35 |
| 40 | 2395 | 27 | 35 |
| 40 | 2400 | 0 | 35 |
| 40 | 2405 | 5 | 35 |
| 40 | 2409 | 9 | 35 |
| 40 | 2413 | 13 | 35 |

In the example embodiment, the control circuit 130 includes a dip switch for adjusting the number of steps taken by the stepper-motor 120. The dip switch may be a linear six position dip switch 140 as depicted in FIG. 2, or a rotary dip switch 140 and two-position jumper 132 as shown in FIG. 1. The dip switch position or setting is used to add or subtract a number of steps, such as increasing the number of steps to switch from natural gas to liquid propane gas. However, use of such a switch may be difficult and/or may lack the ability to change settings in a way that is desired. Thus, the example embodiment allows adjustments may be communicated to the control circuit 130 by the IFC 230, or by any other suitable input means (including by wired or wireless communication from a remote computing device 316). In some embodiments, the dip switch 140 is omitted completely or is not used, and adjustments are made entirely through electronic communication to the control circuit 130 as described herein.

In order to set an adjustment (or offset) from the number of steps listed in the calibration table in the memory 302 of the controller 136, the IFC 230 receives a valve offset. The valve offset may be a single offset to be applied to each control setting in the calibration table, may be a single offset to be applied to a specific control setting in the calibration table, or may be a multipoint offset with more than one offset to be applied to more than one different control settings in the calibration table. For example, a multipoint offset may include two offsets, each applied to more than one and less than all of the control settings. Alternatively, the multipoint offset may include different offsets for each control setting in the calibration table. The valve offset may be input to the IFC 230 using the input device 318 and the display device 320 on the IFC 230. In some embodiments, the valve offset is provided to the IFC 230 from the remote device 316. That is, a user may input (or select from a list) the desired valve offset on the remote device 316, and the remote device 316 then transmits the selected valve offset to the IFC 230. In other embodiments, the remote device 316 transmits the selected valve offset to the control circuit 130 through the communication interface 312.

Upon receiving (or determining) a call for heat, the IFC 230 will command the control circuit 130 to open the gas valve 101. The control circuit 130 will control the valve to a target control setting in the calibration table adjusted in accordance with the valve offset received by the IFC 230.

In some embodiments, the IFC 230 sends the valve offset to the control circuit 130. In other similar embodiments, the remote device sends the valve offset to the control circuit 130. The control circuit 130 then stores the valve offset in the memory 302. When the IFC 230 sends a commanded gas flow corresponding to a target control setting to the control circuit 130, the control circuit 130 retrieves the target control setting from the calibration table and adjusts the target control setting according to the stored valve offset. The commanded gas flow may be an absolute flow rate, a relative amount to open, a relative of flow, or any other suitable command corresponding to the desired amount of gas flow, and will generally correspond to the type of command stored in the calibration table (e.g., if the calibration table identifies steps to achieve a particular flow percentage, the commanded gas flow from the IFC will be provided as a flow percentage). The stored valve offset is also similarly used for future commanded gas flows until a new valve offset is received or the control circuit 130 is instructed to erase or no longer use the stored valve offset. The IFC 230 may also query the control circuit 130 for the currently stored value of the valve offset, and the control circuit is programmed to output the valve offset stored in the memory 302 to the IFC in response to such request.

In some embodiments, the control circuit 130 does not receive the valve offset (from any source). For example, the IFC 230 may determines a desired gas flow rate that is associated with a target control setting. The IFC 230 then determines an adjusted gas flow rate that has a control setting that is equal to the target control setting adjusted in accordance with the valve offset. The IFC 230 outputs the adjusted gas flow rate as a commanded gas flow rate to the control circuit 130. In such embodiments, the control circuit 130 does not know that a valve offset is being applied, and it merely controls the valve 101 according to the control setting in the calibration table that corresponds to the adjusted gas flow rate it received as the commanded gas flow rate. For example, if the valve offset is +5 steps and the desired gas flow rate determined by the IFC is 50% of maximum flow, the IFC may determine that adding five steps to the number of steps corresponding to 50% flow rate yields the same number of steps as correspond to 51% of maximum flow. Thus, the IFC 230 commands the control circuit 130 to open the valve 101 and control the flow to 51% of maximum flow.

Similarly, in some embodiments, the IFC 230 determines a desired gas flow rate that is associated with a target control setting, and determines an adjusted control setting that is equal to the target control setting adjusted according to the valve offset. The IFC 230 then outputs the adjusted control setting to the control circuit 130 and the control circuit controls the valve 101 to the adjusted control setting. In such embodiments, the control circuit 130 does not know that a valve offset is being applied, and it merely controls the valve 101 according to the adjusted control setting without even needing to use the calibration table, which may be omitted in such embodiments. For example, if the valve offset is +5 steps and the desired gas flow rate determined by the IFC corresponds to +100 steps of the stepper motor, the IFC 230 commands the control circuit 130 to open the valve 101 and drive the stepper motor +105 steps.

In embodiments in which the peripheral a peripheral component that that controls operation of the system 200 is a system controller, a thermostat, a mobile device, a computer or any other suitable peripheral other than an IFC for controlling operation of the system 200, the steps described above as being performed by the IFC 230 are performed by the non-IFC peripheral. Moreover, some embodiments may include more than one peripheral (one of which may be the IFC 230). In such embodiments one or more actions described above as performed by the IFC 230 may be performed by the a different peripheral.

In some embodiments, the control of the valve assembly 100 takes into account the orientation of the valve 101 with respect to gravity. With reference to the cross-section in FIG. 1, it can be seen that if the valve 101 is oriented as illustrated, gravity will act on the diaphragms 110 and 104 to pull them toward the direction of the bottom of the page. Thus, gravity will pull the diaphragms toward a closed position. This is true even if the valve assembly 100 is rotate such that the right side of the valve assembly (as shown) rotates into or out of the page. If the valve assembly 100 (and thus the valve 101) is rotated ninety degrees from the illustrated position clockwise, counterclockwise, or the top into/out of the page, the diaphragms 110 and 104 will be oriented vertically and gravity will not act to open or close the diaphragms. This may be referred to as a neutral orientation. If the valve assembly 100 (and thus the valve 101) is rotated one hundred eighty degrees from the illustrated position clockwise, counterclockwise, or the top into/out of the page, the diaphragms 110 and 104 will be oriented upside down relative to the illustrated position and gravity will act in the direction to open the diaphragms. Thus, in the illustrated orientation of the valve 101, gravity makes it easier to close the diaphragms and more difficult to open them as compared to the neutral position. This may cause less gas to flow when a particular control setting is used in the illustrated orientation as compared to the same control setting when the valve 101 is in the neutral orientation. Similarly, in the third described orientation, gravity makes it easier to open the diaphragms and more difficult to close them as compared to the neutral position. Thus, in the third orientation, more gas may flow when a particular control setting is used in the third orientation as compared to the same control setting when the valve 101 is in the neutral orientation. The difference in gas flow between the same control settings in different orientations may be greatest between the illustrated/first orientation and the third orientation, because the diaphragms 104 and 110 are one hundred and eighty degrees differently oriented with respect to gravity. Thus, in at least some embodiments, the IFC 230 and/or the control circuit 130 of the gas valve assembly 100 control the valve 101 based on a desired gas flow and the orientation of the valve 101.

In a first group of embodiments, the orientation of the gas valve 101 is received as a direct user input/selection. The user may input the orientation using, for example, using the input device 318 and the display device 320 of the IFC 230. Alternatively, the user may input (or select) the orientation on the remote device 316. For example, a user interface on the remote device might provide a list of possible orientations from which the user may select the current orientation. The user selected/input orientation may then be output to the IFC 230, the control circuit 130, and/or a different control peripheral.

In a second group of embodiments, the orientation of the gas valve 101 is received as an indirect user input/selection into the IFC 230, the remote device 316, the control circuit 130, or any control peripheral. In such embodiments, for example, the user may select/input the orientation of a component of the system 200 other than the valve 101. The IFC 230 or the control circuit 130 knows the relationship between the orientation of the selected component and the valve 101, and can thus determine the orientation of the valve from the orientation of the component. For example, the user may input the orientation of the IFC 230 relative to gravity, and the memory 306 stores the orientation of the gas valve 101 relative to the orientation of the IFC 230. Thus, the IFC 230 can determine from its own input orientation the orientation of the valve 101. In other embodiments, the other component whose orientation is entered may be a housing of part of the system, a gas inlet pipe connected to the system 200, an air inlet/outlet duct, or any other component having a known orientation relative to the valve 101. In still other embodiments in the second group of embodiments, the user may input a model or part number of the system 200, the IFC 230, or another component or subassembly of the system 200 into the IFC 230, the remote device 316, the control circuit 130, or any control peripheral. In a first subset of embodiments, the system, component, subassembly, or part identified by the model/part number can only be installed in one orientation, and the system 200 (e.g., the memory 306, the valve memory 302, or the like) stores a listing of such model/part numbers and the orientation of the gas valve 101 in the system. In another subset of embodiments, the system, component, subassembly, or part identified by the model/part number can be installed in more than one orientation, and the system 200 (e.g., the memory 306, the valve memory 302, or the like) stores a listing of such model/part numbers, the possible orientations, and the orientation of the gas valve 101 in the system relative to each of the possible system/part/etc. orientations. In this subset, the user then selects in which orientation the system/part/etc. was installed, and the system 200 can determine from that selected orientation the orientation of the valve 101.

In another group of embodiments, the orientation of the gas valve is detected by a component of the system 200 directly or indirectly. In some such embodiments, the orientation of the modulating gas valve 101 is detected from a sensor (such as one of the sensors 312) mounted to the gas valve 101 itself. In some indirect embodiments, the orientation of the modulating gas valve 101 is detected from a sensor (such as one of the sensors 312) mounted on the control circuit 130 and knowledge of the orientation relationship between the control circuit 130 and the modulating gas valve 101. Similarly, the indirect detection may be made using a (such as one of the sensors 310) mounted on the IFC 230 and knowledge of the orientation relationship between the IFC 230 and the modulating gas valve 101. The sensors used for detection of the orientation are accelerometers in some embodiments, and specifically one-axis accelerometers in some embodiments.

A fourth group of embodiments includes hybrids of the techniques used in the first three groups for determining the orientation of the gas valve 101. For example, the user may take a picture of the gas valve, with the bottom of the picture being the direction of the ground, and the IFC 230, the control circuit 130, the remote device 316, or any peripheral may analyze the picture, identify the valve 101, and determine the valve's orientation from the picture using suitable image recognition and identification programming. In other embodiments, the user may take a picture of a component of the system 200 other than the valve 101 and the IFC 230, the control circuit 130, the remote device 316, or any peripheral may analyze the picture, identify the component, determine the component's orientation from the picture using suitable image recognition and identification programming, and determine the orientation of the valve based on the orientation of the component relative to the valve 101. In still other embodiments, the user may take a picture of a model/part number or a barcode or QR code identifying the model/part number, the IFC 230, the control circuit 130, the remote device 316, or any peripheral may analyze the picture to identify the model/part number, and the orientation may be determined from that point as described for the second group of embodiments above.

However acquired, the system uses the orientation of the valve 101 to control the valve 101 to a desired gas flow taking account of the orientation. Similar to the discussion above with respect to valve offsets, the control based on orientation may involve the control circuit 130 knowing or not knowing about the adjustments, and the adjustments may be made/determined by the IFC 230, the control circuit 130, or any other peripheral in various embodiments. For example, all of the techniques described above with respect to valve offsets may be applied for orientation, with a particular valve offset or offsets (e.g., multipoint) associated with each orientation. Thus, for example, the IFC 230 might use the orientation to determine which offset/offsets to apply and send the desired control settings (including the offset) to the control circuit 130, or may send the determined offset to the control circuit for use, or the like. Similarly, the above described techniques may be applied directly to the orientation, with an additional step to determine the adjustment based on the orientation. Thus, the IFC 230 may know the valve orientation and determine an offset, a different control setting, or the like based on the orientation and send the offset, the different control setting or the like to the control circuit 130. In such embodiments, the control circuit 130 may not know the orientation of the valve 101. Alternatively, the control circuit 130 may receive the orientation (from the IFC 230, the remote device 316, another peripheral, or detected by the control circuit 130) and may determine what, if any, adjustments to make to achieve the commanded flow in view of the orientation. In such embodiments, the IFC 230 may not even know the orientation of the valve 101. Moreover, in some embodiments, the techniques with respect to valve offsets are combined with the orientation. For example, the IFC 230 may have a valve offset to apply to a control signal, and may add, subtract, or make no change to the valve offset as appropriate based on the orientation of the valve 101.

As described above, remote device 316 may be used in connection with set-up, control, operation, and the like of the valve assembly 100 and/or the gas valve 101.

Figure 6:
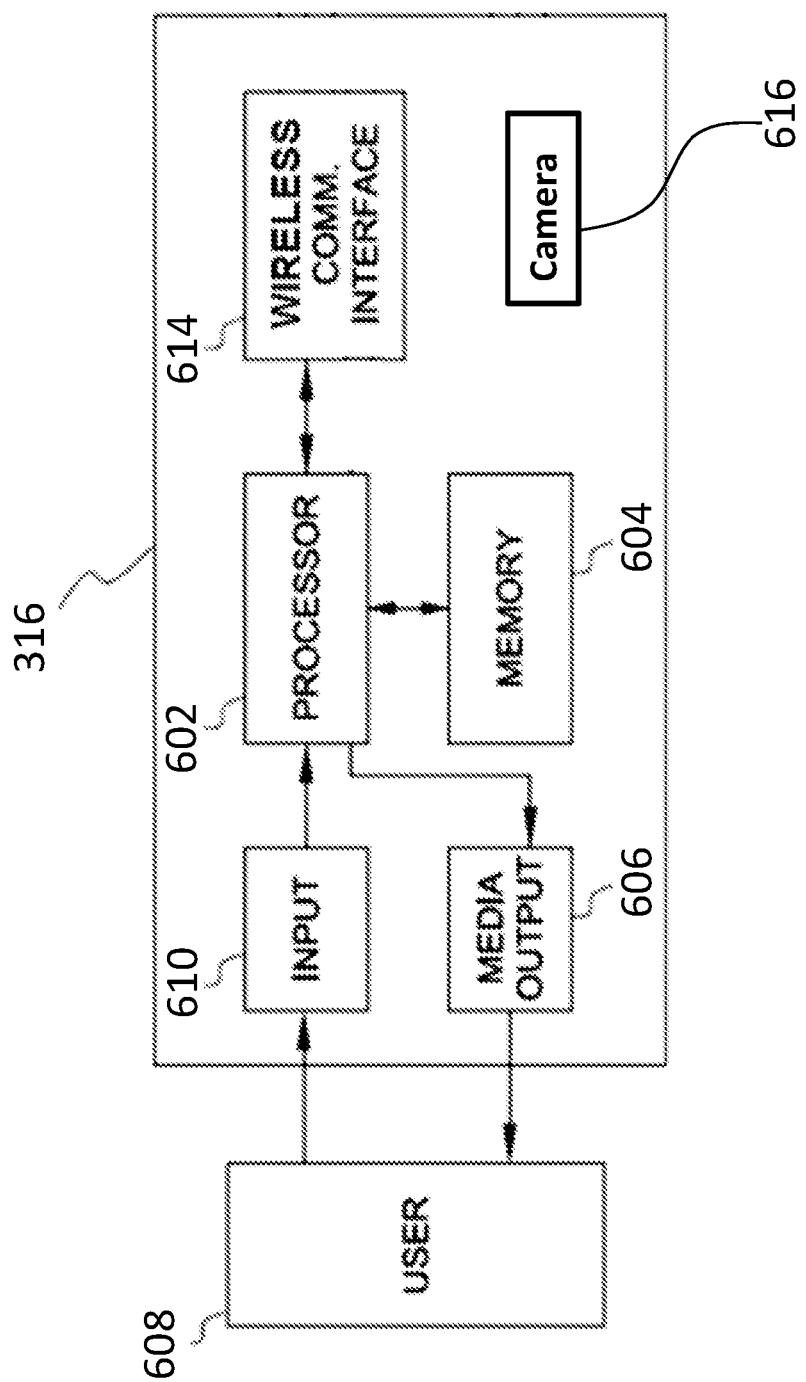
FIG. 6 is a block diagram of a mobile device.

FIG. 6 is an example configuration of the mobile device 316. The mobile device 316 includes a processor 602, a memory 604, a media output component 606, an input device 610, wired communications interfaces 312, a wireless communications interface 614, and a camera 616. Other embodiments include different components, additional components, and/or do not include all components shown in FIG. 6.

The processor 602 is configured for executing instructions. In some embodiments, executable instructions are stored in the memory 604. The processor 602 may include one or more processing units (e.g., in a multi-core configuration). The memory 604 is any device allowing information such as executable instructions and/or other data to be stored and retrieved. The memory 604 may include one or more computer-readable media.

The media output component 606 is configured for presenting information to a user 608. The media output component 606 is any component capable of conveying information to the user 608. In some embodiments, the media output component 606 includes an output adapter such as a video adapter and/or an audio adapter. The output adapter is operatively connected to the processor 602 and operatively connectable to an output device such as a display device (e.g., a liquid crystal display (LCD), organic light emitting diode (OLED) display, cathode ray tube (CRT), "electronic ink" display, one or more light emitting diodes (LEDs)), and/or an audio output device (e.g., a speaker or headphones).

The mobile device 316 includes the input device 610 for receiving input from the user 608. The input device is any device that permits the mobile device 316 to receive analog and/or digital commands, instructions, or other inputs from the user 608, including visual, audio, touch, button presses, stylus taps, etc. The input device 610 may include, for example, keyboard/keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 606 and the input device 610.

The memory 604 stores computer-readable instructions for operation of the mobile device 316. The memory 604 also stores computer-readable instructions for configuring and communicating with system 100, and specifically for configuring and communicating with the controller 200. In some embodiments, the memory 604 stores computer-readable instructions for providing a user interface to the user 608 via media output component 606 and, receiving and processing input from input device 610. The memory 604 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory.

The wireless communication interface 614 is a radio frequency (RF), Bluetooth®, Wi-Fi, a ZigBee®, near field communication (NFC), infrared (IR), and/or any other device and communication protocol for wireless communication.

The memory 604 stores instructions that program the processor 602 to receive settings, adjustments, or other data for use in setting up (e.g., installing), updating, or changing operation of an HVAC system. For example, in some embodiments, the memory 604 stores instructions that program the processor 602 to receive a valve offset from the user 608 and output the valve offset of the modulating gas valve using the communication interface 614. The valve offset may be received by the IFC 230, the gas valve assembly 100, or the like and applied as described above. Additionally or alternatively, the memory 604 may store instructions that program the processor 602 to receive an orientation of the modulating gas valve relative to gravity (or an input useable to determine the orientation as described above—e.g., a picture of the system, a QR code, a model number, or the like) from the user and output the orientation of the modulating gas valve using the communication interface 614. The orientation may be received by the IFC 230, the gas valve assembly 100, or the like and applied as described above. In some embodiments, the memory 604 may store instructions that program the processor 602 to display a menu of modulating gas valve options including one or both of the orientation of the modulating gas valve and the valve offset on the mobile display, and receive a user selection of modulating gas valve options from the mobile input. In some embodiments, the user selection of the orientation of the modulating gas valve may be input at least partially using the camera 61, for example, by taking a picture of part of the system, photographing a QR code or a model number, or the like.

Example embodiments of valves, gas-powered furnace systems, valve controllers, and furnace controllers are described above in detail. The system and controller are not limited to the specific embodiments described herein, but rather, components of the system and controller may be used independently and separately from other components described herein.

When introducing elements of the present disclosure or the embodiment (s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A gas-powered heating system comprising:
a burner;
a modulating gas valve assembly connected between a gas source and the burner, the gas valve assembly including:
a modulating gas valve to variably control a flow of gas through the gas valve assembly; and
a control circuit including a controller and a valve memory;
a mobile device including a mobile communication interface, a mobile processor, and a mobile memory, the mobile memory storing instructions that program the mobile processor to:
receive a valve offset from a user; and
output the valve offset of the modulating gas valve using the mobile communication interface; and
an integrated furnace controller (IFC) including a processor, a memory, and a communication interface, the IFC communicatively coupled to the modulating gas valve assembly and the mobile device, the memory storing instructions that program the processor to:
receive, using the communication interface, the valve offset output from the mobile device;
store the valve offset in the memory;
receive a call for heat; and
output one or more commands to the modulating gas valve assembly in response to the call for heat, the one or more commands causing the modulating gas valve assembly to control the modulating gas valve based on a desired gas flow rate and the valve offset.

2. The gas-powered heating system of claim 1, wherein:
the mobile memory stores instructions that program the mobile processor to:
receive an orientation of the modulating gas valve relative to gravity from the user and
output the orientation of the modulating gas valve; and
the memory of the IFC stores instructions that program the processor to:
receive, using the communication interface, the orientation of the modulating gas valve output from the mobile device; and
store the orientation of the modulating gas valve, where the one or more commands causes the modulating gas valve assembly to control the modulating gas valve based on a desired gas flow rate, the valve offset, and the orientation of the modulating gas valve.

3. The gas-powered heating system of claim 2, wherein the communication interface comprises a wireless communication interface.

4. The gas-powered heating system of claim 3, wherein the wireless communication interface is a Bluetooth communication interface.

5. The gas-powered heating system of claim 3, wherein the wireless communication interface is Wi-Fi communication interface.

6. The gas-powered heating system of claim 3, wherein the wireless communication interface is a near field communication (NFC) communication interface.

7. The gas-powered heating system of claim 2, wherein the mobile device comprises:
a mobile display; and
a mobile input, and the mobile memory stores instructions that program the mobile processor to:
display a menu of modulating gas valve options including the orientation of the modulating gas valve and the valve offset on the mobile display; and
receive a user selection of modulating gas valve options from the mobile input.

8. The gas-powered heating system of claim 2, wherein the mobile device comprises a mobile phone.

9. The gas-powered heating system of claim 2, wherein the mobile device comprises a tablet computer.

10. The gas-powered heating system of claim 2, wherein the mobile device comprises a laptop computer.

11. The gas-powered heating system of claim 2, wherein the communication interface comprises a wired communication interface.

12. A gas-powered heating system comprising:
a burner;
a modulating gas valve assembly connected between a gas source and the burner, the gas valve assembly including:
a modulating gas valve to variably control a flow of gas through the gas valve assembly; and
a control circuit including a controller and a valve memory;
a mobile device including a mobile communication interface, a mobile processor, and a mobile memory, the mobile memory storing instructions that program the mobile processor to:
receive an orientation of the modulating gas valve relative to gravity from a user; and
output the orientation of the modulating gas valve; and
an integrated furnace controller (IFC) including a processor, memory, and a communication interface, the IFC communicatively coupled to the modulating gas valve assembly and the mobile device, the memory storing instructions that program the processor to:
receive, using the orientation of the modulating gas valve from the mobile device;
store the orientation of the modulating gas valve in the memory;
receive a call for heat; and
output one or more commands to the modulating gas valve assembly in response to the call for heat, the one or more commands causing the modulating gas valve assembly to control the modulating gas valve based on a desired gas flow rate and the orientation of the modulating gas valve.

13. The gas-powered heating system of claim 12, wherein the communication interface comprises a wireless communication interface.

14. An integrated furnace controller (IFC) for use in a gas-powered heating system including a modulating gas valve assembly having a modulating gas valve to variably control a flow of gas through the gas valve assembly and a control circuit, the IFC comprising:
a processor;
a memory; and
a communication interface, the IFC communicatively coupled to the modulating gas valve assembly and a mobile device, the memory storing instructions that program the processor to:
receive, using the communication interface, a valve offset output from the mobile device;

store the valve offset in the memory;
receive a call for heat; and
output one or more commands to the modulating gas valve assembly in response to the call for heat, the one or more commands causing the modulating gas valve assembly to control the modulating gas valve based on a desired gas flow rate and the valve offset.

15. The IFC of claim 14, wherein the memory of the IFC stores instructions that program the processor to:
receive, using the communication interface, an orientation of the modulating gas valve output from the mobile device; and
store the orientation of the modulating gas valve, where the one or more commands causes the modulating gas valve assembly to control the modulating gas valve based on a desired gas flow rate, the valve offset, and the orientation of the modulating gas valve.

16. The IFC of claim 15, wherein the communication interface comprises a wireless communication interface.

17. The IFC of claim 16, wherein the wireless communication interface is a Bluetooth communication interface.

18. The IFC of claim 16, wherein the wireless communication interface is Wi-Fi communication interface.

19. The IFC of claim 16, wherein the wireless communication interface is a near field communication (NFC) communication interface.

20. The IFC of claim 15, wherein the communication interface comprises a wired communication interface.

* * * * *